Nov. 29, 1966   A. B. CUNNINGHAM   3,289,154
METHOD OF CONTINUOUS WAVE SEISMIC PROSPECTING
Filed Aug. 24, 1964   3 Sheets-Sheet 1
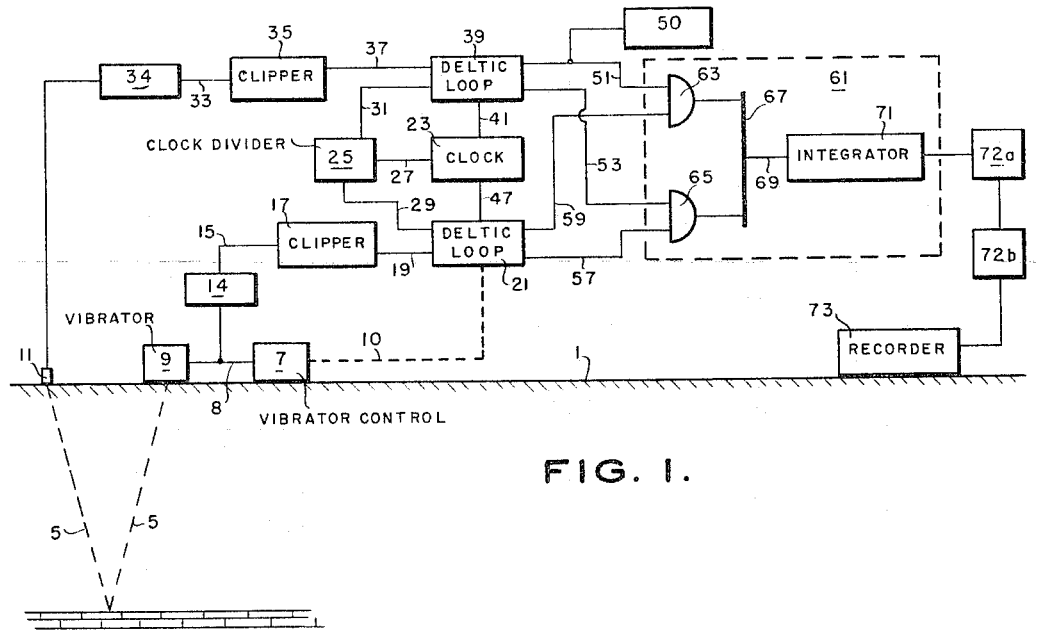
FIG. 1.
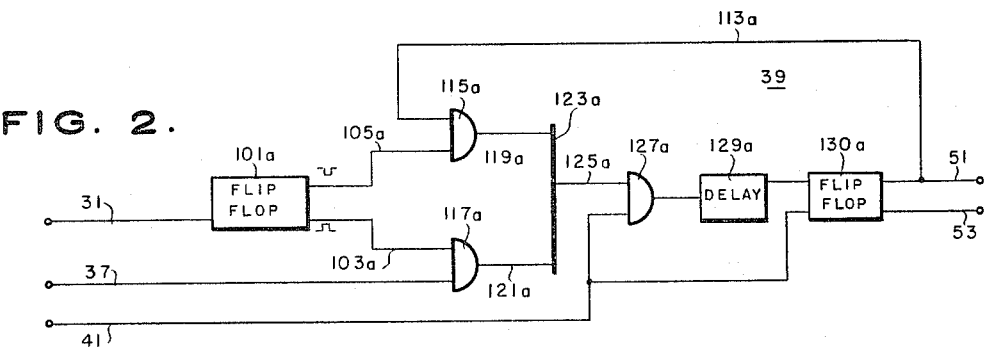
FIG. 2.
FIG. 3.
INVENTOR.
ALLEN B. CUNNINGHAM,
BY John B. Davidson
ATTORNEY.

Nov. 29, 1966   A. B. CUNNINGHAM   3,289,154
METHOD OF CONTINUOUS WAVE SEISMIC PROSPECTING
Filed Aug. 24, 1964   3 Sheets-Sheet 2
FIG. 4.
FIG. 5.
FIG. 6A.
FIG. 6B.
FIG. 6C.
FIG. 6D.
FIG. 6E.
FIG. 6F.
FIG. 6G.
FIG. 6H.
FIG. 6I.
FIG. 6J.
*INVENTOR.*
ALLEN B. CUNNINGHAM,
ATTORNEY.

CALCULATED AMPLITUDE SPECTRUM

MEASURED AMPLITUDE SPECTRUM WITHOUT DIFFERENTIATING CIRCUIT

MEASURED AMPLITUDE SPECTRUM WITH DIFFERENTIATING CIRCUIT

*INVENTOR.*
ALLEN B. CUNNINGHAM,
BY
ATTORNEY.

United States Patent Office 3,289,154
Patented Nov. 29, 1966

1

3,289,154
METHOD OF CONTINUOUS WAVE SEISMIC
PROSPECTING
Allen B. Cunningham, Houston, Tex., assignor, by mesne assignments, to Esso Production Research Company, Houston, Tex., a corporation of Delaware
Filed Aug. 24, 1964, Ser. No. 391,807
7 Claims. (Cl. 340—15.5)

This invention relates to the art of seismic prospecting, and more particularly to seismic prospecting techniques wherein elongated wave trains of seismic signals are injected into the earth.

In the usual type of seismic prospecting, a relatively sharp pulse of elastic wave energy is injected into the earth from a location at or near the earth's surface, and the resulting seismic waves are detected by means of geophones located at a plurality of detecting stations or locations spaced apart on the earth's surface. Electrical output signals from the geophones are simultaneously recorded to form a multiple trace seismogram. The seismogram is examined and operated on in various ways to pick out reflected, refracted, and diffracted waves therein that are indicative of the nature of subsurface strata. In order to determine the depth of a given stratum, the two-way travel time of the seismic waves between the earth's surface and the stratum (as well as the velocity of the waves in the strata through which the waves travel) must be measured very exactly. In this method of seismic prospecting, all of the elastic wave energy is injected into the earth at substantially the same time, and undesired components of the traces of the seismograms may be eliminated by frequency discrimination.

In another type of seismic prospecting that has found relatively limited use to date, an elongated vibratory seismic signal or wave train is injected into the earth. Preferably, the injected seismic signal is nonrepetitive or random during a time interval which is substantially longer than the travel time of the signal along the longest travel path of interest. Expressed in another manner, the duration of the signal is at least as long as the travel time of the signal along any of the paths by which it reaches a detecting location at usable energy levels. In the usual case in reflection seismographing, the longest travel path of interest will be the shortest path from the seismic wave source to the deepest reflecting horizon which it is desired to delineate and back to the earth's surface at the detecting location farthest removed from the seismic source. Seismic waves produced by the vibratory seismic signal are detected at one or more detecting locations removed from the injecting location. It has been the practice to produce a counterpart electrical replica of the injected signal (i.e., an electrical signal substantially identical to the injected seismic signal) by means of a geophone at the injecting location. This geophone may be either connected to the vibratory source or positioned in the earth near the source. The replica signal is cross correlated with each signal produced at the detecting stations. The cross correlation is carried out at a plurality of time-phase relationships between said each signal and the replica signal. The time-phase relationship of the replica signal and each signal cross correlated therewith which yields the greatest value of correlation is used as a parameter of the travel time of the injected signal from the injecting location to the detecting location corresponding to said each signal. Correlation between the replica signal and an electrical signal representative of detected seismic waves typically has been accomplished by initially recording both signals, reproducing the signals as time series, combining the time series emphasizing amplitude variations in the combined time series, integrating the resulting signal, and shifting the time-phase relationship (or $\tau$) between the reproduced signals with respect to their time-phase relationship as originally recorded. The general method is described in U.S. Patent 2,989,726, Crawford et al., and will be recognized as being of the type operating in the time domain.

A form of injected signal that has been widely used in the above-described method is that of a sinusoid which is continuously varied in frequency so as to be nonrepetitive over a desired time interval. The cross correlation curve resulting from a given reflection obtained with such a signal is that of a major lobe flanked by minor lobes diminishing in amplitude and extending from the major lobe in both directions on the "$\tau$" axis of the correlation curve. The side lobes may be of sufficient amplitude to mask all of the lobes of a relatively smaller amplitude correlation signal resulting from a reflection from a relatively poor reflecting horizon located near a good reflecting horizon. A much better type of injected seismic signal is a pseudo-random signal having an amplitude density spectrum given by the formula Sin $X/x$ where X represents frequency over a preselected frequency spectrum. Preferably, this type of seismic signal is formed according to a binary code of maximal length. The term "binary code of maximal length" signifies a binary code which may be represented as a reference time series, which code is formed by operating on a binary code group of N digits according to a predetermined rule of formation such that the code group will not repeat itself before $2^N-1$ digits. Expressed in another manner, a binary code group of maximal length is a binary code wherein a binary group of N digits at the beginning thereof is not repeated until the code has at least $2^N-1$ digits therein. For example, if the five digit code group 01101 is used, N will be equal to 5 and $2^N-1$ equals 31. A binary code of maximal length can be formed therefrom by starting off with the five digit code group 01101 and setting the next digit equal to the sum modulo 2 of the first, second, third, and fifth digits preceding it; this results in the six digit code group 011010. This process is repeated with the resulting code group 011010, again setting the next digit equal to the sum modulo 2 of the first, second, third, and fifth digits preceding it to form the seven digit code group 0110100. The process is repetitively repeated to form each successive digit and the following binary code is obtained before any five digit code group is repeated:

0110100001100100111110111000101

By applying the above-specified rule of formation, it will be found that after 31 digits, the sequence will repeat. For a more complete discussion of shift register or null sequence code of maximal length, reference may be had to the following: "The Synthesis of Linear Sequential Coding Networks" by D. A. Huffman, Proc. Third London Symposium on Information Theory, September 1955; and "Several Binary-Sequence Generators" by N. Zierler, Tech.

Rep. 95, Lincoln Laboratory, Massachusetts Institute of Technology, Cambridge, Massachusetts, September 1955.

Injecting a binary code of maximal length into the earth in the form of a seismic signal presupposes that a characteristic of the seismic signal is variable between two distinct conditions. For example, the amplitude may be varied between two magnitudes or the phase may be varied between two phase relationships. As a specific example, the injected signal may be made from a constant frequency sinusoidal signal of constant amplitude, the phase of which is varied between mutually opposite phase relationships in accordance with a binary code of maximal length having a time duration at least equal to twice the travel time of seismic waves between the earth's surface and the deepest earth reflecting horizon of interest. As indicated above, it has been the usual practice to record the electrical replica signal and the electrical signal produced by detecting the seismic signal in reproducible form so that the electrical signals subsequently may be reproduced and cross correlated to determine the time-phase relationship producing a maximum correlation value. For the following reasons it has been found necessary to perform a correlation operation at a time subsequent to the time of the seismic observation. First, the correlation operation performed according to prior art techniques consumes an inordinately large amount of time. Second, it is extremely costly to maintain a seismic crew in the field so that as much as possible of the crew's time must be spent making seismic observations. Manifestly, it is desirable to perform a correlation operation immediately after making a seismic observation so that the results thereof can be used as a guide for immediately subsequent seismic observations. Therefore, it is desirable to have available a technique for performing "on line" correlation.

In accordance with the teachings of the present invention, a continuous wave seismic observation is carried out in accordance with prior art techniques such as described above by transmitting or injecting a vibratory seismic signal into the earth and detecting seismic waves at one or more detecting locations spaced apart from the injecting location. An electrical replica of the signal as injected is produced along with first electrical signals representative of the vibratory signal received at each detecting point utilized. The electrical replica and the first electrical signals are operated on to produce time-differentiated electrical signals. First and second electrical pulse trains are produced by producing electrical pulses at salient points in the waveform of the time-differentiated electrical replica of the injected signal, and by producing electrical pulses at salient points in the waveform of the time-differentiated signal produced from the electrical signal representative of the seismic signals received at a given detecting location. The first and second pulse trains are thereupon compressed in real time by increasing the pulse repetition rate thereof while maintaining constant the relative time spacing between the pulses. The first and second compressed pulse trains are thereupon correlated at a predetermined number of time-phase relationships to each other to produce an output signal indicative of the degree of correlation therebetween, which signal is doubly integrated and plotted as a function of time-phase relationship between the pulse trains whereby travel time is established in accordance with the value of time-phase relationship between the pulse trains corresponding to a maximum value of correlation magnitude.

Preferably, the pulse trains are formed by repetitively detecting the polarity of an electrical signal at a repetition rate at least two times greater than the highest frequency of the electrical replica of the injected signal, and producing a pulse when the polarity of the electrical signal is of a given polarity. In this manner a pulse train is produced when the electrical signal from which the pulse train is being formed is of a given polarity.

Further in accordance with a preferred manner of carrying out the invention, the compressed pulse train formed from the time-differentiated electrical replica of the injected signal is stored in reproducible form and is continuously reproduced while the detected signals are being converted into a pulse train and compressed in real time. Further, while the second signal is being converted into a pulse train and compressed in real time, there is successively reproduced a plurality of different overlapping portions of the second pulse train equal in duration to the first pulse train, which different overlapping portions are synchronized with the repetitively reproduced pulse train and cross correlated therewith.

Objects and features of the invention not apparent from the above discussion will become evident upon consideration of the following detailed description thereof taken in connection with the accompanying drawings, wherein:

FIG. 1 is a schematic diagram of apparatus in accordance with the invention;

FIG. 2 is a schematic electrical diagram of apparatus suitable for use as delay line time-compression apparatus 39 of FIG. 1;

FIG. 3 is a schematic diagram of apparatus suitable for use as delay line time-compression loop apparatus 21 of FIG. 1;

FIG. 4 is a waveform of square wave representation of a binary code of maximal length;

FIG. 5 is a waveform on the same time scale as FIG. 4 representative of a sinsoidal constant frequency seismic signal varied between two phases to represent the binary code of maximal length shown in FIG. 4;

FIGS. 6A through 6J are waveform representations of signals which may appear in the apparatus of FIG. 1, which waveform representations are useful in understanding the operation of the apparatus of FIG. 1.

Figure 7:
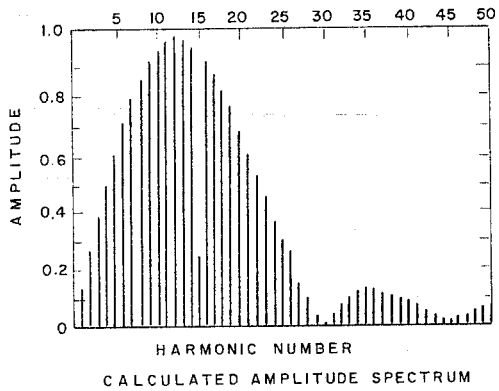
FIGS. 7, 8, and 9 are amplitude spectrum curves useful in understanding one aspect of the invention.

At this point, it is well to define certain terminology used herein. The term "deltic loop" is applied to a time-compression apparatus wherein a portion of a low frequency signal of duration T' is sampled at N different times separated by a shorter interval of period T. The sequence of N samples is squeezed together to form a high speed replica of the incoming signal wherein the time compression factor is given by $T'/T$ which is equal to N, the number of samples. The replica is stored in a high speed recirculation storage loop of recirculation period T so that the compressed information is repetitively available for the convenient application of signal processing methods. The time compression and sampling process is continuously carried out by removing the oldest sample in the replica and replacing it with a new one each time the replica completes another cycle of circulation in the storage channel. Cross correlation of two independent low frequency input signals can be obtained by using a deltic loop for each input to obtain a high speed replica of each signal, storing the replica of one of the input signals in a stationary "storage channel" wherein the replica merely repetitively circulates without replacement of the oldest sample therein, and comparing the replica of said one of the input signals with the precessing replica of the other input signal.

With reference now to the schematic diagram of the seismic prospecting apparatus of FIG. 1, there is shown a vibrator 9 positioned on the earth's surface 1, and a geophone 11 positioned at a detecting location remote from vibrator 9. In accordance with the usual practice in seismology, more than one geophone may be used at each detecting location, interconnected to produce a single electrical signal, and more than one detecting location may be spaced apart on either or both sides of the vibrator. The vibrator 9 may be any of the usual types of vibrators known to the art, and preferably is an electrohydraulic vibrator such as is manufactured by the M. B. Electronics Company of New Haven, Connecticut, and by the Ling Electronics Company of Anaheim, California. Such vibrators utilize a hydraulically actuated piston to vibrate an object and to control the hydraulic force on the piston in accordance with variations in the amplitude of a relatively small amplitude electrical signal connected thereto. The vibrator 9 is coupled to a vibratory control unit 7 by electrical lead 8. The vibratory control unit 7 may be a magnetic tape reproducing unit, and the vibratory signal may be prerecorded on the magnetic tape for repetitive reproduction by the reproducer. Other types of vibratory control units known to the art may be utilized.

The output signals from vibratory control unit 7 and geophone 11 respectively are applied to electrical differentiating circuits 14 and 34. These circuits are adapted to produce output signals which are the time differentials of the input signals applied thereto, and may be of the type described in Application Manual for Philbrick Octal Plug-In Computing Amplifiers, published by George A. Philbrick Researches, Inc. (1956). The output signals of circuits 14 and 34 are respectively applied to clipper or limiter circuits 17 and 35 through electrical leads 15 and 33.

The output signals from clippers 17 and 35 are applied through leads 19 and 37 to delay line time-compression apparatus 21 and 39, respectively, which are known in the art as deltic loops. Deltic loops are described in an article in the periodical Electronics, vol. 34, pp. 191–193. The function of the deltic loops 21 and 39 is to compress pulse trains from clippers 17 and 35 by decreasing the real time spacing between individual pulses in a given pulse train while maintaining constant the relative time spacing between said individual pulses. Expressed otherwise, the deltic loops increase the pulse repetition rate of pulse trains applied thereto while maintaining constant the relative time spacing between the pulses in the pulse train. Control signals for controllably actuating deltic loops 21 and 39 are derived from an electronic clock 23 adapted to produce a constant frequency, high frequency output signal on leads 27, 41, and 47. The signals on leads 41 and 47 are applied directly to deltic loops 39 and 21, respectively, while the output signal on line 27 is decreased in frequency or repetition rate by clock divider 25, and the output signals are applied to deltic loops 39 and 21 by leads 31 and 29. A suitable clock is a high frequency oscillator driving a pulse generator such as that designated model SC40 by Computer Control Company of Los Angeles, California. A suitable clock divider is a counter such as that built by Lavoie Instrument Company of Morganville, New Jersey and designated model LA40. Suitable deltic loop circuits for deltic loops 39 and 21 are illustrated in FIGS. 2 and 3, respectively, and will be described below.

Output signals from deltic loop 39 appear on leads 51 and 53, and output signals from deltic loop 21 appear on leads 57 and 59. The presence of pulses on leads 51 and 59 are indicative of a given condition which may be a binary digit 1, whereas pulses on leads 53 and 57 are indicative of an opposite condition which may be the binary digit 0. Leads 51 and 59 are connected to an AND circuit 63 while leads 53 and 57 are coupled to AND circuit 65. The output signals of AND circuits 63 and 65 are coupled to integrator 71 through an OR circuit 67. AND circuits 63 and 65, OR circuit 67, and integrator 71 make up a coincidence-type correlator. Whenever input pulses appear simultaneously on leads 51 and 59 or on leads 53 and 57, an output pulse will appear on lead 69 from OR circuit 67. Pulses appearing at lead 69 are applied to integrator 71. The output signal from integrator 71 is doubly integrated by sequentially-connected integrators 72a and 72b, and the output signal of integrator 72b is coupled to recorder 73 for recordation thereby. The over-all operation of the apparatus of FIG. 1 will be described below after discussion of the circuits of FIGS. 2 and 3, and waveforms of FIGS. 4 and 5.

The deltic loop 39 illustrated in FIG. 2 utilizes three AND circuits 115a, 117a and 127a, and an OR circuit 123a. Each of the AND circuits is adapted to produce an output signal whenever signals are simultaneously applied to the input circuits thereof. OR circuit 123a is adapted to produce an output signal whenever input signals are coupled to either of the input circuits thereof. The output signals from AND circuits 115a and 117a are coupled to the input circuits of OR circuit 123a by lines 119a and 121a, respectively, and the output signal from the OR circuit 123a is coupled to AND circuit 127a by line 125a. A high frequency clock signal from lead 41 is coupled to the other input signal of AND circuit 127a so that an output signal will be produced thereby whenever signals are simultaneously received from OR circuit 123a and clock 23 through lead 41. The output signals from AND circuit 127a are delayed by a fixed time delay means 129a and are coupled to one of the input circuits of AND circuit 115a through flip-flop circuit 130a. Flip-flop circuit 130a also receives clock signals from line 41, and is adapted to produce an output pulse on line 51 when pulses are concomitantly received from time delay circuit 129a and line 41, and to produce a pulse on line 53 when no pulse is received from time delay circuit 129a concomitantly with reception thereby of a pulse from line 41. A flip-flop circuit that will accomplish this function is described in Catalog "H" of Computer Control Company of Los Angeles, California.

The clipped geophone signal from clipper 35 appearing on line 37 is applied to one of the input circuits of AND circuit 117a. Control signals for AND circuits 115a and 117a are derived from the output circuits of a monostable multivibrator or flip-flop circuit 101a which receives trigger pulses from clock divider 25 through line 31. The pulses applied to AND circuit 115a through line 105a are the complements of the signals applied to AND circuit 117a through line 103a so that, assuming that the clock signals applied to flip-flop circuit 101a are of 1 microsecond duration and have a repetition rate of 1000 pulses per second, a 1-microsecond activating pulse will be applied to AND circuit 117a and a 999-microsecond activating pulse will be applied to AND circuit 115a by flip-flop circuit 101a. Thus, flip-flop circuit 101a will bias-on AND circuits 115a and 117a in alternation.

The overall operation of the circuit of FIG. 2 is as follows. Assume that the time delay provided by delay circuit 129a is 999 microseconds and that trigger signals of 1 microsecond duration and a repetition rate of 1000 p.p.s. are applied to flip-flop circuit 101a. The first pulse applied to AND circuit 117a on line 37 will pass through AND circuits 117a and 127a and OR circuit 123a, and will be delayed for 999 microseconds by delay circuit 129a. Flip-flop circuit 130a will be triggered so that a pulse will appear on line 51 and also will be applied through line 113a to the input of AND circuit 115a. Since circuit 115a is biased-on by the output signal from flip-flop circuit 101a, the pulse will pass through AND circuit 115a and will continue circulating in the storage loop defined by AND circuits 115a and 127a, OR circuit 123a, delay circuit 129a, and flip-flop circuit 130a to produce an output pulse every one thousand microseconds on line 51. One microsecond after the first pulse passes through AND circuits 115a and 127a, another activating pulse will be applied to AND circuit 117a on line 103a, and will produce a pulse in the output of AND circuit 117a provided a signal concomitantly appears on lead 37. In effect then, AND circuit 117a applies a pulse to OR circuit 123a every 1001 microseconds provided that an input signal concomitantly appears on line 37. Each pulse or lack of pulse applied to OR circuit 123a by AND circuit 117a precedes the immediately previously injected pulse or lack of pulse. After 1 second the loop will be full. Thereafter, the oldest pulse circulating in the loop will be eliminated because AND circuit 115a will be biased-off by the signal appearing on line 105a when the oldest pulse is applied to the input of AND circuit 115a. Therefore, the oldest information (pulse or lack of pulse) circulating in the storage loop is continuously removed after the loop is full. In effect then, the apparatus shown in FIG. 2 repetitively samples the signal applied thereto on line 37 to form a pulse train indicative of the signal or lack of signal at each sampling, compresses the pulse train in real time, and continuously removes the oldest pulse in the pulse train and replaces it with a new one each time the pulse train completes a cycle of circulation in the storage loop thereof. Stated in another manner, each pulse produced by AND circuit 117a is introduced in a compressed pulse train of N bits at the beginning of the train, then precesses slowly through the compressed train until it appears N times later on output lead 51, after which it is removed from the pulse train.

The circuit of FIG. 3 is suitable for use as deltic loop 21 and in certain respects is the same as the apparatus of FIG. 2. Circuit elements in FIGS. 2 and 3 having the same reference numerals and differing in designation only by suffix letters, are identical and perform the same functions. The circuit of FIG. 3 differs from the circuit of FIG. 2 in the following respects. An AND circuit 137 is added having its output connected to an input circuit of OR circuit 123b. A time delay circuit 135 is connected between line 113b and an input circuit of AND circuit 137. The output circuit of flip-flop circuit 101b is connected to an input circuit of AND circuit 137 rather than to an input circuit of AND circuit 115b. A timer circuit 131 is provided which applies an activating signal to AND circuit 137 for a given interval of time, and thereafter switches the activating signal to AND circuit 115b. The timer circuit may consist of a D.C. bias source and a conventional spdt timing switch. The output channels of timer 131 are respectively connected to the input circuits of AND circuits 115b and 137 so that the AND circuits will be biased-on thereby in alternation. The timer 131 is connected by a mechanical or electrical lead 10 to vibratory control 7 so as to begin timing upon activation of vibrator 7 so as to bias-off AND circuit 137 and bias-on AND circuit 115b after a timed-out interval. (Prior to the end of the interval, AND circuit 115b was biased-off and AND circuit 137 was biased-on.) The time delay provided by delay circuit 135 is equal to the time duration between pulses applied to line 47. The timed-out interval of timer 131 is equal to the time delay provided by delay element 129a times the quantity $T'/T$, previously defined. The time delay provided by element 129a is equal to the sum of the time delay effected by elements 129b and 135. The operation of the apparatus of FIG. 3 is substantially the same as that of FIG. 2 until timer circuit 131 biases-on AND circuit 115b and biases-off AND circuit 137. Thereupon the pulse train in the storage loop of the circuit 21 at the time that timer circuit 131 is actuated will continue to circulate in the storage loop and the bits thereof will not be replaced inasmuch as AND circuit 137 is biased-off. The time delay in the storage loop of circuit 21 now being slightly less than the time delay in the storage loop of circuit 39, in effect there will be a precession of information in the storage loops of the circuits 21 and 39.

It should be noted that when a pulse appears on one of output lines 51 and 59, no pulse will appear on the corresponding line 53 or 57, and that when no output pulses appear on one of lines 51 and 59, an output pulse will thereupon appear on the corresponding line 53 or 57. A clock signal from line 47 resets flip-flop circuit 130b and clock pulses appear on line 57. For a more complete general explanation of deltic loops, reference is made to the article in Electronics, supra.

With reference now to FIG. 4, there is reproduced the binary code of maximal length discussed above and a waveform indicative of the binary code of maximal length wherein signals of one polarity indicate the binary digit 1, and signals of the opposite polarity indicate the binary digit 0. Manifestly, it is very difficult to inject a signal having such a waveform into the ground with a vibrator or similar device; it is more feasible to inject a signal having continuously variable amplitude, such as a sine wave. The binary code of maximal length can be formed from a sine wave signal by varying the signal between two conditions, such as by varying the phase thereof. It is manifest from an inspection of FIG. 5 that when the signal is of one phase, the binary digit 0 is represented, and that when the signal is of the opposite phase, the binary digit 1 is represented.

With reference again to FIG. 1, let it be assumed that vibrator 9 produces a signal such as that shown in FIG. 5, under the control of vibrator control unit 7. The seismic signal produced by vibrator 9 will be injected into the earth and a portion thereof will follow ray path 5 and will be detected by geophone 11. The electrical output signal from vibrator control unit 7 is transmitted on line 15 to differentiating circuit 34. The output signal from circuit 34 is applied to clipper 17 whereat it is converted into a pulse train. Assuming, for example, that a portion of the output signal of vibrator control unit 7 is as shown in FIG. 6A, a signal having the waveform shown in FIG. 6B will appear at the output of differentiating circuit 14. This signal is operated on by clipper 17, and an output signal such as shown in FIG. 6C will appear on line 19. A pulse train as shown in FIG. 6C will appear at the output of AND circuit 117b (see FIG. 3). Similarly, assuming that a seismic signal as shown in FIG. 6F is applied to differentiating circuit 34 and that the differentiated signal is applied to clipper 35, the signal shown in FIG. 6G will appear at the output of differentiating circuit 34, and the wave train shown in FIG. 6H will appear at the output of AND circuit 117a. Responsive to such signals and to the clock signals applied to the deltic loops through clock 23 and clock divider 25, the signals from AND circuits 117a and 117b will be time-compressed and will appear on lines 51 and 59 in the same form as shown in FIGS. 6C and 6F, but at a much higher repetition rate. Assuming that the signals shown in FIGS. 6C and 6F represent the signals on lines 51 and 59, signals will appear on lines 53 and 57 having shapes as shown in FIGS. 6D and 6G, further assuming the time scale as in FIGS. 6C and 6F. The pulse trains will be correlated by correlator 61 to produce a pulse on line 69 whenever pulses appear simultaneously either on lines 51 and 59 or on lines 53 and 57. The pulses are integrated by electronic integrator 71, the signal from integrator 71 is repeatedly integrated by integrators 72a and 72b, and the resulting signal is recorded by recorder 73. The integrators 71, 72a and 72b may be conventional analog integrators such as are described in Application Manual for Philbrick Octal Plug-In Computing Amplifiers, supra.

When the internal storage of deltic loop 21 is fully loaded, timer 131 will bias-on AND circuit 115b and bias-off AND circuit 137 so that the time-compressed signal stored in the storage loop of deltic loop 21 is repetitively reproduced and cross correlated with the signal stored in the storage loop of deltic loop 39. Inasmuch as the seismic signal from geophone 11 is continuously replacing the earliest stored portion of the signal stored in the delay unit of deltic loop 39, the output signal from time delay means 129a is constantly changing. In effect, the time-phase relationship of the replica signal applied to deltic loop 21 and the seismic signal applied to deltic loop 39 likewise is continuously changing so that the output signals from the deltic loops 21, 39 and correlator 61 will provide a constantly changing cross correlation signal to recorder 73. It is manifest that the pulse train derived from the replica signal applied to deltic loop 21 is stored in reproducible form and continuously and repetitively reproduced, and that both the signals applied to deltic loops 21 and 39 are continuously compressed in real time and that the ouput signals from the deltic loops are continuously cross correlated with varying time-phase relationships. Viewed in another manner, the deltic loop 39 successively reproduces a plurality of different overlapping portions of the pulse train applied thereto for cross correlation with the repetitively reproduced pulse train applied to deltic loop 21. The correlation signal derived from correlator 61 is the second time derivative of the correlation of the replica signal and the output from geophone 11. Therefore, the signal from correlator 61 is doubly integrated by integrators 72a and 72b to form a second correlation signal, the amplitude of which is indicative of the correlation between the output signals of geophone 11 and the replica signal. Travel time of seismic waves from vibrator 9 to geophone 11 can be established in accordance with the values of time-phase relationship between pulse trains corresponding to maximum values of the output signal from integrator 72b.

It is evident that the time required for correlation can be easily reduced by a factor of 1000 or more, assuming that the pulse repetition rate of clock 23 is 1000 times the delay time of relay means 129a.

It is desirable to have a seismic signal injected into the earth by vibrator 9, which is non-repetitive, for a time interval of at least 6 seconds. Assuming that the repetition rate of clock 23 is one million pulses per second and that the clock divider 25 divides by a factor 1000, then delay means 129a must have a delay of 1000 microseconds, time delay means 135 must have a delay of 1 microsecond, and time delay means 129b must have a delay of 999 microseconds for the system of FIG. 1 to operate properly. The six-second signal can be accommodated by various techniques known to the art, such as varying the repetition rates of the clock signals and the time delays effected by the time delay units, and by connecting several deltic units, as described above, in tandem.

The use of differentiating circuits 14 and 34 and integrators 72a and 72b has been found to substantially increase the ratio of the amplitude of a central major lobe of a reflection to the amplitude of minor lobes flanking the major lobe in correlograms produced with the apparatus of FIG. 1. This ratio may be termed the "peak-to-ripple" ratio. When the differentiating circuits 14 and 34 and integrators 72a and 72b are eliminated from the circuit, the circuit still functions satisfactorily, but the peak-to-ripple ratio is very substantially lowered. The reason for this phenomenon is believed to be that a small amplitude event will be superimposed on large amplitude noise signal bursts in the output signal of a geophone so that often zero crossings (or reversals) will not be obtained. Only when the noise is of small amplitude will there be zero crossing. With reference to the waveform of FIG. 6F, for example, it can be seen that at the valleys A, B, and C the waveform does not cross the zero axis. If these valleys were the valleys of a reflected event, the ultimate result would be imperfect cross correlation of the replica signal with the reflection in the geophone output signal. As a result, the peak-to-ripple ratio on a correlogram would be substantially reduced. As the result of the inclusion of differentiating circuits 14 and 34 in the circuit of FIG. 1, it is immaterial whether or not the geophone output signal reversed in polarity during the portions thereof containing reflected events. Reversals in slope of the geophone output signal will be detected so that the cross correlation of a geophone output signal with the replica signal will be much more perfect.

In connection with FIG. 1, it is to be noted that a variable-frequency heterodyne frequency meter 50 is connected to the output lead 51 of deltic loop 39. It has been found that the inclusion of differentiating circuit 34 ahead of clipper 35 makes it possible to use the heterodyne frequency meter to measure the frequency spectrum of a reflection event in a signal produced by geophone 11. By the term "variable-frequency heterodyne frequency meter" is meant an instrument that beats a variable frequency electrical signal against a test signal of unknown frequency content to derive an output indication, which may be in visible form, of the amplitude of the frequency components of the test signal. A suitable meter is that manufactured by the Singer Metrics Company and designated model SPA-3.

Figure 8:
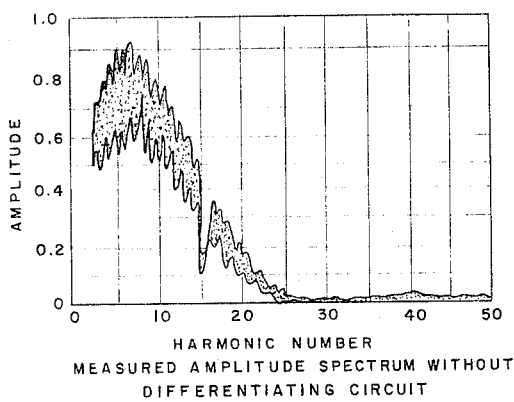
Figure 9:
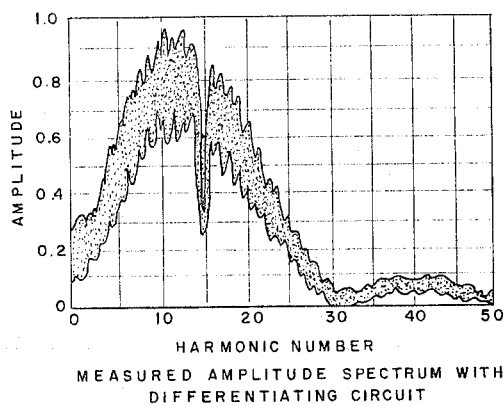

The significance of the inclusion of the differentiating circuit will become apparent from an examination of the amplitude spectrum curves of FIGS. 7, 8 and 9. In FIG. 7 is the calculated amplitude spectrum of a particular test signal formed in the manner described above by varying a sinusoidal signal between opposite phase relationships in accordance with a binary code of maximal length. The curve of FIG. 7 was laboriously calculated using known techniques. The curve of FIG. 8 was obtained by applying the test signal to the input of clipper 35 and photographing the presentation screen of a Singer Metrics model SPA-3 frequency meter 50. It is readily apparent that the measured amplitude spectrum of FIG. 8 is quite different from the calculated amplitude spectrum of FIG. 7 in that there is a pronounced shift to the low frequencies. The curve of FIG. 9 was similarly obtained by applying the signal to the input of differentiating circuit 34. The improvement in the results is obvious. The curve of FIG. 9 clearly is an excellent measured estimate of the true spectrum shown in FIG. 7.

The manner in which the frequency meter 50 is used is as follows. It is well known that the amplitude spectrum (or amplitude vs. frequency distribution) of a seismic signal is changed as it is transmitted through the earth. This change is not uniform for all locations but varies somewhat at various locations at which seismic observations are conducted. Often the spectrum of a received signal is not the most desired; a change in the spectrum of a received signal could substantially improve the character of seismograms. Now, let it be assumed that a seismic observation has been conducted at a given location on the earth's surface using a seismic source producing a pesudo-random, elongated, vibratory seismic wave train, and that reflection events have been identified on the seismogram as having been reflected from a known reflecting horizon or as corresponding to events at a given location on the time axis of a correlogram made as described above. Let it also be assumed that a reproducible seismogram was obtained during the seismic observation; i.e., a seismogram from which electrical signals may be produced corresponding to the geophone output electrical signal from which the seismogram was produced. Selecting one of the traces, the portion of the seismogram corresponding to the reflection event may be readily identified since the transmission time of the event is known and the time duration of the transmitted signal is known. This portion of the trace is reproduced as an electrical signal and applied to differentiating circuit 34, and a record is made of the amplitude spectrum indication of meter 50. If the spectrum is not that which is known to be most effective, the spectrum of the transmitted signal may be changed by using another binary code of maximal length having a known amplitude density spectrum to form the pseudo-random transmitted signal. The above steps will be repeated as many times as necessary to obtain a received signal having the desired amplitude density spectrum. This may be done by correlating the various spectra thus produced to determine the one having the most desirable shape for subsequent seismic operations in the area.

Instead of reproducing a portion of a seismogram trace, a gating apparatus may be inserted in the line between line 51 and meter 50. The gate will be activated at a predetermined time after activation of vibrator 9 (preferably by a start signal from the vibrator through an interval counter) to pass signals on line 51 to meter 50 for an interval equal to the time interval over which vibrator 9 is activated. The predetermined time will be the travel time of the reflection events referred to above as having been identified on the correlogram.

The invention is not necessarily to be restricted to the specific structural details, arrangement of parts, or circuit connections herein set forth, as various modifications thereof may be effected without departing from the spirit and scope of the invention.

What is claimed is:

1. In the method of measuring the travel time along at least one path of propagation through the earth between spaced first and second points thereon of a vibratory signal injected into the earth at said first point which is substantially longer than the travel time of such signal along any of those paths of its propagation through the earth by which it reaches said second point at usable energy levels, the improvement which comprises:

forming a shift register binary code of maximal length;

varying a characteristic of said vibratory signal injected into the earth at said first point in accordance with said binary code of maximal length for a time interval which is substantially longer than the travel time of said signal along any of those paths of its propagation through the earth by which it reaches said second point at usable energy levels before repeating said binary code;

producing a first electrical signal which is a replica of said varied vibratory signal and a second electrical signal representative of the varied vibratory signal as received at said second point;

producing a third electrical signal which is the time differential of said first electrical signal;

producing a fourth electrical signal which is the time differential of said second electrical signal;

producing electrical pulses at salient points in the third electrical signal to form a first pulse train and at salient points in the fourth electrical signal to form a second pulse train;

compressing said first and second pulse trains in real time by decreasing the real time spacing between individual pulses thereof while maintaining constant the relative time spacing between said individual pulses;

cross-correlating said first and second pulse trains at a predetermined number of time-phase relationships therebetween to produce a first correlation signal having an amplitude varying in accordance with the degree of correlation between said pulse trains at various time-phase relationships therebetween; and doubly integrating the first correlation signal to produce a second correlation signal whereby travel time is established in accordance with the value of time-phase relationship between said pulse trains corresponding to a maximum value of magnitude of said second correlation signal.

2. In the method of measuring the travel time along at least one path of propagation through the earth between spaced first and second points thereon of a vibratory signal injected into the earth at said first point which is substantially longer than the travel time of such signal along any of those paths of its propagation through the earth by which it reaches said second point at usable energy levels, the improvement which comprises:

forming a shift register binary code of maximal length;

varying a characteristic of said vibratory signal injected into the earth at said first point in accordance with said binary code of maximal length for a time interval which is substantially longer than the travel time of said signal along any of those paths of its propagation through the earth by which it reaches said second point at usable energy levels before repeating said binary code;

producing a first electrical signal which is a replica of said varied vibratory signal and a second electrical signal representative of the varied vibratory signal as received at said second point;

producing a third electrical signal which is the time differential of said first electrical signal;

producing a fourth electrical signal which is the time differential of said second electrical signal;

repetitively detecting the polarity of each of said third and fourth electrical signals at a repetition rate greater than the highest frequency of said first electrical signal and producing a pulse whenever either of said third or fourth signals is of a given polarity to produce first and second pulse trains respectively corresponding to said third and fourth electrical signals;

continuously compressing in real time said first and second pulse trains by decreasing the real time spacing between the individual pulses thereof while maintaining constant the relative time spacing therebetween;

cross-correlating said first and second pulse trains at a predetermined number of time-phase relationships therebetween to produce a first correlation signal having an amplitude varying in accordance with the degree of correlation between said pulse trains at various time-phase relationships therebetween; and doubly integrating the first correlation signal to produce a second correlation signal whereby travel time is established in accordance with the value of time-phase relationship between said pulse trains corresponding to a maximum value of magnitude of said second correlation signal.

3. In the method of measuring the travel time along at least one path of propagation through the earth between spaced first and second points thereon of a vibratory signal injected into the earth at said first point which is substantially longer than the travel time of such signal along any of those paths of its propagation through the earth by which it reaches said second point at usable energy levels, the improvement which comprises:

forming a shift register binary code of maximal length;

varying a characteristic of said vibratory signal injected into the earth at said first point in accordance with said binary code of maximal length for a time interval which is substantially longer than the travel time of said signal along any of those paths of its propagation through the earth by which it reaches said second point at usable energy levels before repeating said binary code;

producing a first electrical signal which is a replica of said varied vibratory signal and a second electrical signal representative of the varied vibratory signal as received at said second point;

producing a third electrical signal which is the time differential of said first electrical signal;

producing a fourth electrical signal which is the time differential of said second electrical signal;

repetitively detecting the polarity of each of said third and fourth electrical signals at a repetition rate greater than the highest frequency of said first electrical signal and producing a pulse whenever either of said third and fourth signals is of a given polarity to produce first and second pulse trains respectively corresponding to said first and second electrical signals;

continuously compressing in real time said first and second pulse trains by decreasing the real time spacing between the individual pulses thereof while maintaining constant the relative time spacing therebetween;

storing said compressed first pulse train in reproducible form;

repetitively reproducing said first pulse train;

repetitively cross-correlating said repetitively reproduced first pulse train with the time-compressed second pulse train at a predetermined number of time-phase relationships therebetween to produce a first correlation signal having an amplitude varying in accordance with the degree of correlation between said pulse trains at various time-phase relationships therebetween; and doubly intergrating the first correlation signal to produce a second correlation signal whereby travel time is established in accordance with the value of time-phase relationship between said pulse trains corresponding to a maximum value of magnitude of said second correlation signal.

4. In the method of measuring the travel time along at least one path of propagation through the earth between spaced first and second points thereon of a vibratory signal injected into the earth at said first point which is substantially longer than the travel time of such signal along any of those paths of its propagation through the earth by which it reaches said second point at usable energy levels, the improvement which comprises:

forming a shift register binary code of maximal length;

varying a characteristic of said vibratory signal injected into the earth at said first point in accordance with said binary code of maximal length for a time interval which is substantially longer than the travel time of said signal along any of those paths of its propagation through the earth by which it reaches said second point at usable energy levels before repeating said binary code;

producing a first electrical signal which is a replica of said varied vibratory signal and a second electrical signal representative of the varied vibratory signal as received at said second point;

producing a third electrical signal which is the time differential of said first electrical signal;

producing a fourth electrical signal which is the time differential of said second electrical signal;

repetitively detecting the polarity of each of said third and fourth electrical signals at a repetition rate greater than the highest frequency of said first electrical signal and producing a pulse whenever either of said third and fourth electrical signals is of a given polarity to produce first and second pulse trains respectively corresponding to said first and second electrical signals;

continuously compressing in real time said first and second pulse trains by decreasing the real time spacing between the individual pulses thereof while maintaining constant the relative time spacing therebetween;

storing said compressed first pulse train in reproducible form;

with production of each portion of said time-compressed second pulse train, simultaneously reproducing said time-compressed first pulse train, and cross-correlating said reproduced, time-compressed first pulse train with each portion of said time-compressed second pulse train to derive a first correlation signal;

doubly integrating said first correlation signal to produce a second correlation signal; and recording the second correlation signal thus obtained as a function of the time-phase relationship between the reproduced, time-compressed first pulse train and said each portion of said time-compressed pulse train.

5. The method of seismic prospecting in a given area comprising:

(1) at a transmitting location on the earth's surface in said area, injecting into the earth a pseudo-random vibratory seismic wave train having a known frequency spectrum;

(2) at least one detection location spaced apart from said transmitting location, detecting resulting seismic waves and forming an electrical signal from seismic waves reflected from a given subsurface reflecting horizon;

(3) differentiating said electrical signal to form a second electrical signal;

(4) respectively detecting the polarity of said second electrical signal at a repetition rate higher than the highest frequency of said second electrical signal, and producing a pulse whenever said second electrical signal is of a given polarity to form a pulse train;

(5) continuously compressing in real time the pulse train by decreasing the relative time spacing between the individual pulses thereof while maintaining constant the relative time spacing therebetween;

(6) with a variable frequency heterodyne frequency meter, measuring the frequency spectrum of the time-compressed pulse train;

(7) repeating steps 1–6 with the pseudo-random vibratory seismic wave trains of different known frequency spectra until a desired frequency spectrum is obtained upon performance of step 6; and (8) conducting a seismic survey of said area using the pseudo-random vibratory seismic wave train yielding said desired frequency spectrum determined by performance step 7.

6. The method of seismic prospecting in a given area comprising:

(1) at a transmitting location on the earth's surface in said area, injecting into the earth a pseudorandom vibratory seismic wave train having a known frequency spectrum;

(2) at at least one detecting location spaced apart from said transmitting location, detecting resulting seismic waves and forming a reproducible seismogram from the detected seismic waves;

(3) locating a reflection event in said seismogram and reproducing as an electrical signal the portion of the seismogram containing the event;

(4) differentiating said electrical signal to form a second electrical signal;

(5) repetitively detecting the polarity of said second electrical signal at a repetition rate higher than the highest frequency of said second electrical signal, and producing a pulse whenever said electrical signal is of a given polarity to form a pulse train;

(6) continuously compressing in real time the pulse train by decreasing the relative time spacing between the individual pulses thereof while maintaining constant the relative time spacing therebetween;

(7) with a variable frequency heterodyne frequency meter, measuring the frequency spectrum of the time-compressed pulse train;

(8) repeating steps 1–7 with pseudo-random vibratory seismic wave trains of different known frequency spectra until a desired frequency spectrum is obtained upon performance of step 7; and (9) conducting a seismic survey of said area using the pseudo-random vibratory seismic wave train yielding said desired frequency spectrum determined by performance of step 8.

7. The method of seismic prospecting in a given area comprising:

(1) at a transmitting location on the earth's surface in said area, injecting into the earth a pseudo-random vibratory seismic wave train having a known frequency spectrum;

(2) at at least one detecting location spaced apart from said transmitting location, detecting resulting seismic waves and forming a reproducible seismogram from the detected seismic waves;

(3) locating a reflection event in said seismogram and reproducing as an electrical signal the portion of the seismogram containing the event;

(4) differentiating said electrical signal to form a second electrical signal;

(5) repetitively detecting the polarity of said second electrical signal at a repetition rate higher than the highest frequency of said second electrical signal, and producing a pulse whenever said electrical signal is of a given polarity to form a pulse train;
(6) continuously compressing in real time the pulse train by decreasing the relative time spacing between the individual pulses thereof while maintaining constant the relative time spacing therebetween;
(7) with a variable frequency heterodyne frequency meter, measuring the frequency spectrum of the time-compressed pulse train;
(8) repeating steps 1–7 with pseudo-random vibratory seismic wave trains of different known frequency spectra;
(9) correlating the frequency spectra obtained by the repeated performances of step 7 to determine the particular pseudo-random vibratory seismic wave train producing the most desirable frequency spectrum by performance of step 7; and
(10) conducting a seismic survey of said area using said particular pseudo-random vibratory seismic wave train.

References Cited by the Examiner

UNITED STATES PATENTS

| | | |
|---|---|---|
| 3,167,738 | 1/1965 | Westerfield. |
| 3,185,958 | 5/1965 | Masterson et al. _____ 181—.5 |
| 3,198,281 | 8/1965 | Mifsud _____ 181—.5 |

SAMUEL FEINBERG, *Primary Examiner.*

R. M. SKOLNIK, *Assistant Examiner.*